March 22, 1966  A. R. DAVIS, JR  3,242,356
ELECTROMAGNETIC DEVICE
Filed Aug. 20, 1962  3 Sheets-Sheet 1
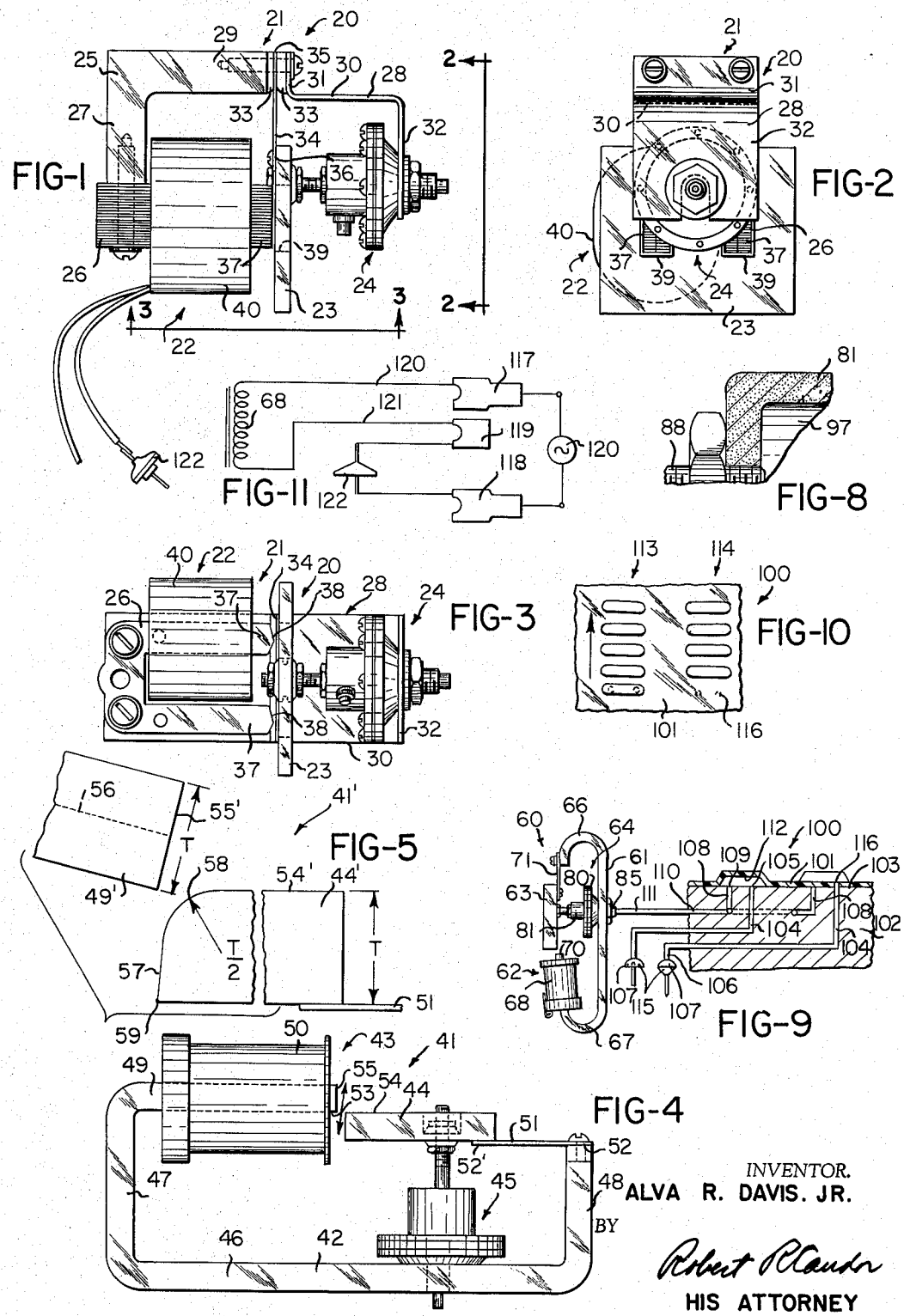
INVENTOR.
ALVA R. DAVIS, JR.
BY
Robert P. Lauder
HIS ATTORNEY March 22, 1966　　A. R. DAVIS, JR　　3,242,356
ELECTROMAGNETIC DEVICE
Filed Aug. 20, 1962　　3 Sheets-Sheet 2
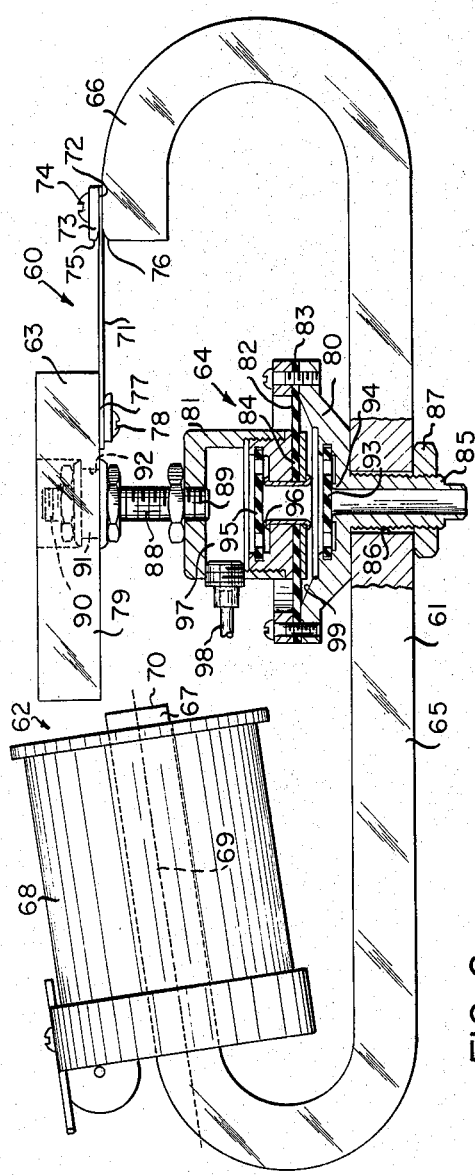
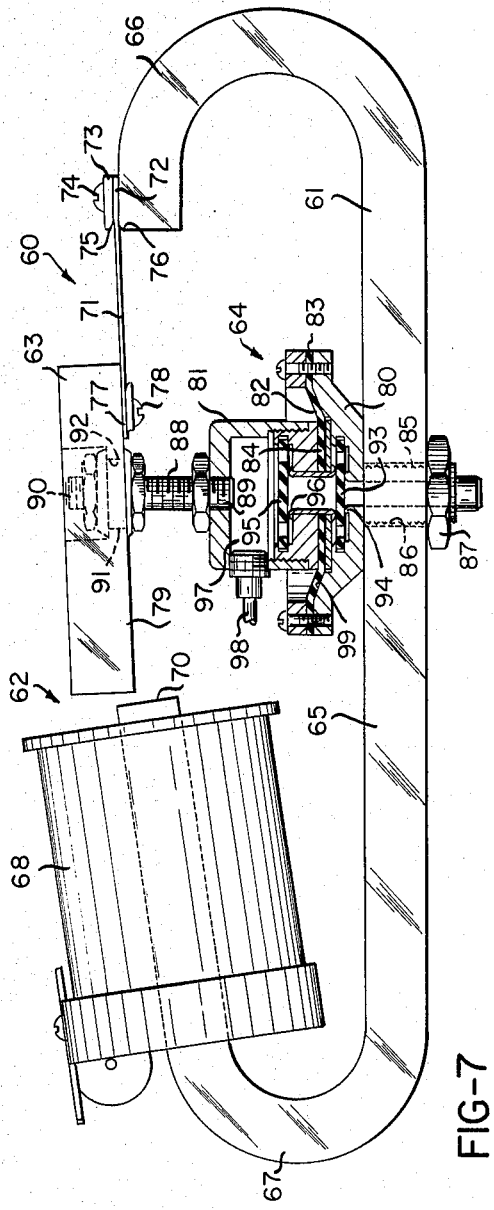
INVENTOR.
ALVA R. DAVIS JR.
BY
HIS ATTORNEY March 22, 1966 A. R. DAVIS, JR 3,242,356
ELECTROMAGNETIC DEVICE
Filed Aug. 20, 1962 3 Sheets-Sheet 3
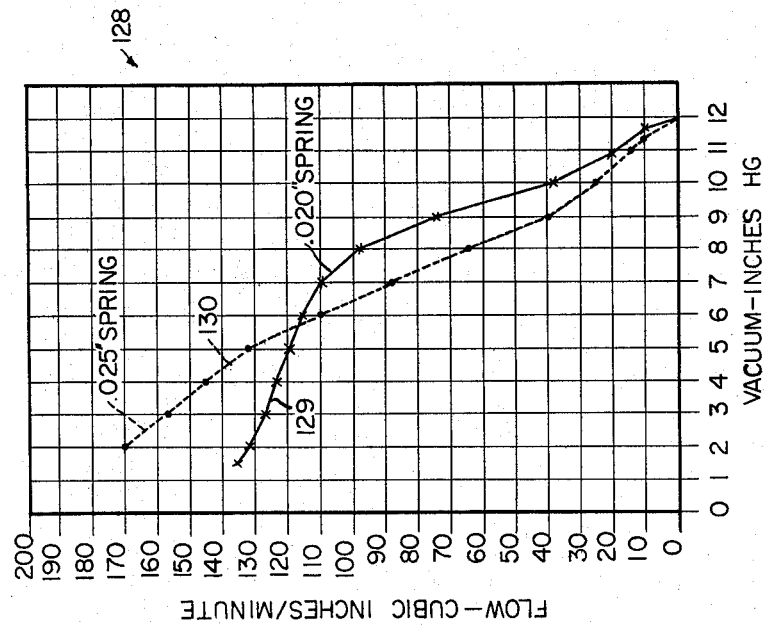
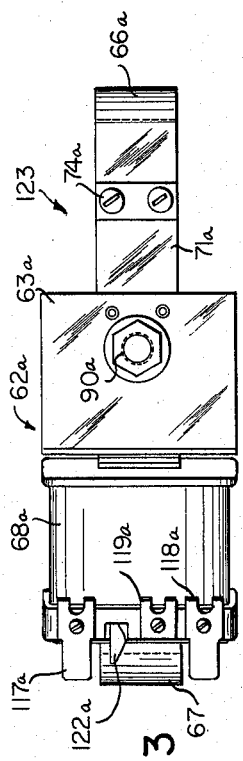
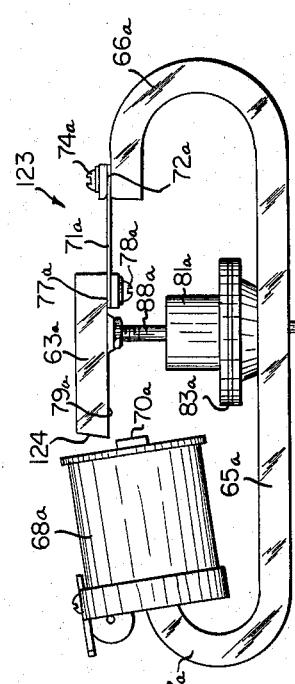
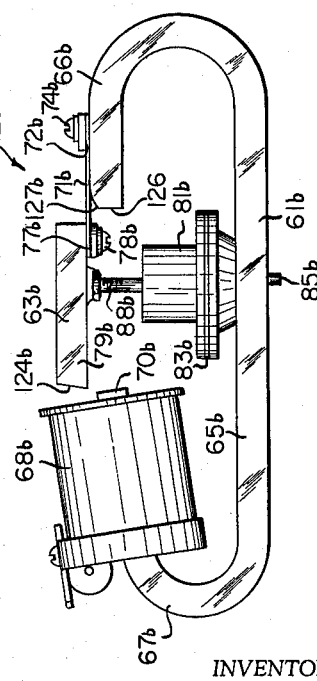
INVENTOR.
ALVA R. DAVIS. JR.
BY
*Robert R Candr*
HIS ATTORNEY United States Patent Office 3,242,356
Patented Mar. 22, 1966

3,242,356
ELECTROMAGNETIC DEVICE
Alva R. Davis, Jr., Corona del Mar, Calif., assignor to Robertshaw Controls Company, Richmond, Va., a corporation of Delaware
Filed Aug. 20, 1962, Ser. No. 217,856
24 Claims. (Cl. 310—29)

This invention relates to an improved electromagnetic device and to improved parts for such a device or the like.

In one embodiment of this invention, the electromagnetic device comprises an electromagnetic vibrator motor adapted for driving a diaphragm type fluid pump.

The various features of this invention are particularly adaptable for being utilized in combination with a diaphragm type fluid pump set forth in the copending United States patent application, Serial No. 149,990 filed November 3, 1961, now abandoned.

More specifically, the features of this invention are particularly adaptable when the fluid pump is used to produce a vacuum for a vacuum program system which requires a substantially constant source of vacuum at a substantially regulated vacuum pressure and which also requires a variable capacity in the vacuum pump so that the vacuum pump can effectively maintain the desired vacuum with automatically reduced volumetric capacity when no substantial volume of air movement is required in the system, the pump automatically increasing its volumetric capacity when a substantial amount of air is to be removed from the program system.

While the electromagnetic devices of this invention have many improved features over the devices set forth in the above-mentioned copending patent application, one feature of this invention is to provide an electromagnetic motor wherein the armature moves along an oscillating axis disposed transverse to the core axis.

Accordingly, it is an object of this invention to provide an improved electromagnetic device or the like having one or more of the novel features of this invention set forth above or hereinafter shown or described.

Another object of this invention is to provide improved parts for such an electromagnetic device or the like.

Other objects, uses and advantages of this invention are apparent from a reading of this description which proceeds with reference to the accompanying drawings forming a part thereof and wherein;

FIGURE 1 is a side view of the electromagnetic device fully disclosed in the above-mentioned copending patent application.

FIGURE 2 is an end view of the device illustrated in FIGURE 1 and is taken in the direction of line 2—2 of FIGURE 1.

FIGURE 3 is a bottom view of the device illustrated in FIGURE 1 and is taken in the direction of the lines 3—3 of FIGURE 1.

FIGURE 4 is a side view of one of the improved electromagnetic devices of this invention.

FIGURE 5 is an enlarged fragmentary view of another device of this invention similar to the device illustrated in FIGURE 4.

FIGURE 6 is a side view, partially in cross-section, illustrating another electromagnetic device of this invention.

FIGURE 7 is a view similar to FIGURE 6 illustrating the device of FIGURE 6 in another operating position thereof.

FIGURE 8 is a fragmentary view of a portion of the diaphragm type air pump illustrated in FIGURE 6.

FIGURE 9 is a schematic view illustrating one application of the electromagnetic device of this invention.

FIGURE 10 is a top view of a portion of the structure illustrated in FIGURE 9.

FIGURE 11 is a schematic view illustrating one method of wiring the electromagnetic device of FIGURE 6.

FIGURE 12 is a side view similar to FIGURE 6 and illustrates another embodiment of this invention.

FIGURE 13 is a top view of the device illustrated in FIGURE 12.

FIGURE 14 is a view similar to FIGURE 12 and illustrates another electromagnetic device of this invention.

FIGURE 15 is a graph illustrating the performance of the electromagnetic devices of this invention with different sized leaf springs.

While the various features of this invention are hereinafter described and illustrated as being particularly adaptable for use with a fluid pump or the like it is to be understood that the various features of this invention can be utilized singly or in various combinations thereof to control other operating devices as desired.

Therefore, this invention is not to be limited to only the embodiments illustrated in the drawings, because the drawings merely illustrate one of the wide variety of uses of this invention.

Referring now to FIGURES 1–3, an electromagnetic device is generally indicated by the reference numeral 20 and comprises the subject matter of aforementioned copending patent application.

In general, the electromagnetic device 20 includes a frame means 21 carrying an electromagnetic vibrator motor 22, a magnetic armature 23 and a diaphragm type fluid pump 24.

The frame means 21 includes a substantially rigid L-shaped frame member 25 carrying a U-shaped laminated core means 26 on the arm 27 thereof and being interconnected to a resilient frame member 28 at the arm 29 thereof.

The resilient frame member 28 has a substantially straight body portion 30 provided with oppositely directed end portions 31 and 32, the end portion 32 suitably mounting the diaphragm type fluid pump 24 and the end portion 31 thereof cooperating with the arm 29 of the rigid frame member 25 to sandwich a pair of pivot members 33 therebetween.

A leaf spring 34 has one opposed end 35 thereof secured between the pivot members 33 and the other opposed end 36 thereof secured to the armature 23, the armature 23 being operatively interconnected to the diaphragm type fluid pump 24 as fully disclosed in the aforementioned copending patent application.

As illustrated in FIGURE 3, the core means 26 of the electromagnetic vibrator motor 22 has a pair of legs 37 provided with pole or core faces 38 adapted to be received in substantially rectangular holes 39 formed in the armature 23 when the armature 23 is pulled into overlapping relation with the core means 26 in opposition to the force of the leaf spring 34 tending to maintain the armature 23 in the neutral position illustrated in FIGURE 1.

The vibrator motor 22 includes an electrical coil 40 disposed about one of the legs 37 of the core means 26 whereby it can be seen that the centerline of the resulting vibrator motor assembly 22 is disposed out of line with the plane passing through the centerline of the frame means 21, the centerline of the armature 23 and the centerline of the diaphragm type fluid pump 24.

Because of this offset relation of the vibrator motor 22 relative to the centerline of the frame means 21, armature 23 and fluid pump 24, unequal electromagnetic forces provided by the legs 37 of the core means 26 tend to cause mechanical interference between the armature 23 and the core means 26 when the armature 23 is moved in an arcuate path over the core means 26.

It was found that small variations in the air gaps between the armature 23 and the core legs 37 and the uneven distribution of electromagnetic flux resulting from the core being on one leg 37 of the core means 26, caused undesirable torques to be developed in the device 20 necessitating either/or both larger air gaps and stronger motor structures to avoid mechanical interference between the armature 23 and the core means 26 over the complete range of pump operation. The larger air gaps reduced the energy available to drive the pump 24 while the stronger motor structure complicated the design and increased the cost.

Therefore, this invention provides an electromagnetic device wherein the oscillating movement of the armature is transverse to the core axis of the motor so that mechanical interference between the armature and the core means is prevented regardless of the amplitude of oscillation.

Further, the various components of the device of this invention are mounted on centerlines disposed in a common plane so that the electromagnetic forces are symmetrical about the centerlines of the various parts to prevent objectionable torsional forces as provided by the coil 40 by the device 20.

In particular, reference is made to FIGURE 4 wherein an electromagnetic device of this invention is generally indicated by the reference numeral 41 and comprises a substantially C-shaped frame means or member 42 carrying a vibrator motor 43, a magnetic armature 44 and a fluid pump 45.

The frame member 42 can comprise a solid member of bar stock or the like suitably shaped so that the same has a substantially straight body portion 46 provided with end portions 47 and 48, the end portion 48 being disposed substantially perpendicularly to the body portion 46 while the end portion 47 has a reversely turned section 49 disposed substantially parallel with the body portion 46.

The section 49 of the frame member 42 provides a core means for the motor 43, the motor 43 including an electrical coil 50 disposed around the core means 49.

A leaf spring 51 has one opposed end 52 secured to the end portion 48 of the frame member 46 and the other opposed end 52' thereof secured to the armature 44, the armature 44 being interconnected to the pump 45 in the manner set forth in the aforementioned copending patent application.

The lower face 53 of the core means 49 is disposed in substantially the same plane as the upper face 54 of the armature 44 when the armature 44 is disposed in the neutral position illustrated in FIGURE 4.

Therefore, it can be seen that the armature 44 will oscillate along an axis disposed transverse to the axis of the core means 49 while operating the pump 45, the pump 45 performing a suction stroke as the armature 44 is moved into substantial alignment with the core means 49 and the pump 45 performing an exhaust stroke as the leaf spring 51 returns the armature 44 from substantial alignment with the core means 45 back to the position illustrated in FIGURE 4.

The neutral or "at rest" relationship between the core means 49 and the armature 44 of the device 41 as illustrated in FIGURE 4 represents the position of maximum electromagnetic force in the upward perpendicular direction to the axis of the specific electromagnetic field such as would be produced by a fixed value of direct current flowing in the coil on the motor frame 42. This will be true regardless of whether the armature 44 is moved about a pivot point 52 on the motor frame 42 as illustrated or is moved with a constant horizontal air gap distance past the pole or core face 55 of the motor frame 42 with the plane of the armature 44 always parallel to the horizontal plane of the motor frame 42.

However, it was found that maximum conversion of electromagnetic to mechanical energy was not being obtained by the device 41. The low efficiency was caused principally by the large increase in air gap which occurred as the armature 44 oscillated from its neutral position, as well as by the decrease which would occur in the perpendicular component of force, even if possible to maintain a constant air gap distance. The net result of these was that the motor, and hence the pump, output was low.

It was found that improvement in performance could be effected by establishing certain physical and hence magnetic, relationships between the motor frame and the armature while still maintaining the general configuration illustrated in FIGURE 4 in which the neutral relationship between the armature 44 and the core means 49 represented the position of maximum perpendicular force.

This improvement was accomplished by angling the core means 49 with respect to the armature 44 so that the magnetic core 49 was "looking" down at the armature 44 from an angle of approximately 14 degrees above the plane of the armature 44.

For example, such a device is illustrated schematically in FIGURE 5 and is generally indicated by the reference numeral 41' wherein the core means 49 has its longitudinal axis 56 disposed substantially perpendicular with its core face 55' and angularly disposed relative to the upper surface 54' of the armature 44'.

By thus angling the position of the armature 49' relative to the armature 44', this has the effect of maintaining a smaller air gap in the magnetic circuit as the armature 44' was pulled upwardly toward an in-line relationship with the core means 49', thereby increasing both magnetic flux and the perpendicular force component driving the pump.

In a magnetic circuit, such as one represented by the vibrator motors of this invention, the armature seeks to establish a position which presents minimum reluctance and maximum flux for any specific fixed value of magnetizing force. This normally would be represented by an in-line relationship between the armature and core means and would be achieved if air gap (reluctance) and flux (lines of force) were steadily decreasing and increasing values, respectively, until this relationship was reached. External forces on the armature resulting from the spring and the pump, however, would exert their influence against an in-line relationship being achieved unless the magnetic force was great enough to overcome their effect.

Because the pole or core face 55' of the core means 49' is flat, and the end 57 of the armature 44' is flat, and, in addition, the upper surface 54' of the armature 44' is offset from the plane of the leaf spring 51 by the thickness of the armature 44', it is possible to achieve a position of minimum reluctance and maximum flux without the armature necessarily being in true in-line relationship with the core means 49'. When this occurs, armature stroke and pump output will be reduced.

Further, it has been found that by shaping the leading edge 57 of the armature 44', it is possible to overcome these deficiencies of operation and achieve a vibrator in which the armature 44' seeks to attain an in-line position with respect to the core means 49', thereby increasing output and efficiency of energy conversion.

It has been found that an optimum configuration for the particular size of motor 43 and thickness of material being used for the core means 49' and armature 44' was one in which the upper corner 58 of the armature 44' was radiused to approximately ½ the armature thickness T and the leading surface 47 beveled at approximately 5 degrees from the lower corner 59.

Other thicknesses of core means and armatures, particularly if unequal to one another, and differences and distance from the pivot point to the leading edge of the aramture would require different shaping dimensionally for best results, although the basic approach to the solution of the problem would be similar.

In the electromagnetic devices 20, 41 and 41', the pump suction stroke is driven by the sine wave electromagnetic energy, and the exhaust stroke is driven by the energy stored in the particular leaf spring 34 or 51.

Investigation of how well matched the suction stroke power requirements were to the sine wave pulse of energy led to construction of a motor in which the suction stroke was driven by the energy stored in the leaf spring and the exhaust stroke was driven by the sine wave pulse of energy.

In general, power requirements of the exhaust stroke were found to be lower and less critical than the suction stroke. It was further found that the particular pump being used preferred the even release of energy provided by the leaf spring on a suction stroke, and performance was improved.

This change of mode in operation necessitated a change in the motor frame so that the core means thereof was "looking" up at the armature from an angle of approximately 8 degrees from the plane of the armature.

However, the basic approach to improved performance is the same regardless of whether the core means "looks" down at the armature, with the suction stroke being driven electromagnetically, or the core means "looks" up at the armature, with the suction stroke being driven by the energy stored in the leaf spring. The differences between the two approaches with respect to the core means angle and how the leading edge of the armature should be shaped result from motor design and dimensions rather than from any significant differences in electromagnetic characteristics.

In particular, reference is made to FIGURES 6 and 7 wherein another electromagnetic device of this invention is generally indicated by the reference numeral 60 and comprises a substantially C-shaped frame means 61 carrying a vibrator motor 62, a magnetic armature 63 and a diaphragm type fluid pump 64.

The motor frame or frame means 61 has a substantially straight body portion 65 provided with inwardly turned end portions 66 and 67.

An electrical coil 68 is disposed around the end portion 67 of the frame means 61 and completes the motor assembly 62.

The end portion 67 of the frame means 61 forms the core means for the motor 62 and has its longitudinal axis 69 disposed substantially perpendicular to its pole or core face 70 and at an acute angle relative to the straight portion 65 of the frame means 61.

The reversely turned portion 66 of the motor means 61 is disposed susbtantially parallel with the body portion 65 of the frame means 61.

A leaf spring 71 has one end 72 thereof sandwiched between the end portion 66 of the frame means 61 and a pivot member 73, the pivot member 73 and leaf spring 71 being mounted to the frame means 61 by a rivet 74 or the like.

The pivot member 73 and the end portion 66 of the frame means 61 respectively have radiused corners 75 and 76 to prevent stressed areas on the leaf spring 71 as the same oscillates in a manner hereinafter described.

The other end 77 of the leaf spring 71 is secured to the armature 63 by rivets or the like 78, whereby the armature 63 is adapted to move through an arcuate oscillating axis disposed transverse to the axis 69 of the core means 67.

Further, it can be seen that the pole or core face 60 of the core means 67 "looks" up at the armature 63 because the longitudinal axis 69 of the core means 67 is disposed at an acute angle relative to the lower surface 79 of the armature 63.

While the particular details of the diaphragm type fluid pump 64 are fully disclosed in the aforementioned copending patent application, only sufficient details thereof will now be described to permit understanding of the various features of this invention.

In particular, the diaphragm type fluid pump 64 comprises a pair of housings 80 and 81 secured together by a flexible diaphragm 82, the diaphragm 82 having its outer periphery 83 secured to the housing 80 and its inner periphery 84 secured to the housing 81.

The housing 80 has a threaded tubular inlet extension 85 projecting through a bore 86 in the frame member 61 whereby the pump 64 is adapted to be secured to the frame member 61 by a nut 87.

The housing 81 is interconnected to the armature 63 by a threaded shaft or stem 88 having one end 89 threaded into the housing 81 and the other end 90 thereof secured to a resilient grommet 91 press-fitted in a suitable bore 92 in the armature 63 whereby the armature 63 is adapted to move through an oscillating arcuate path while the shaft 88 and housing 81 move along a substantially straight longitudinal oscillating axis.

The housing 80 carries a resilient inlet valve member 93 normally seated against an inlet valve seat 94.

The housing 81 carries a resilient exhaust valve member 95 normally seated against an exhaust valve seat 96, the valve seat 96 leading to an exhaust chamber 97 in the housing 81, which is adapted to be interconnected to an exhaust conduit 98.

Alternately, a portion of the housing 81 defining the chamber 97 thereof can be formed of porous material as illustrated in FIGURE 8, whereby the exhaust fluid directed to the exhaust chamber 97 is adapted to escape out of the porous housing 81, if desired.

Therefore, it can be seen that as the armature 63 is drawn into substantial alignment with the core means 70 by the motor 62 in opposition to the force of the leaf spring 71, the volume of the chamber between the valve means 93 and 95 decreases, whereby the fluid trapped therebetween opens the exhaust valve member 95 and escapes out through the exhaust conduit 98.

Thereafter, when the armature 63 is returned back to the position illustrated in FIGURE 6 by the force of the leaf spring 71, the volume of the chamber between the valve means 93 and 95 increases, causing a vacuum condition therein, whereby the inlet valve member 93 is opened to draw fluid through the inlet portion 85 into the pump 64.

Thus, the pump 64 performs a suction stroke when the armature 63 is moved by the leaf spring 71 out of substantial alignment with the core means 67 back to the position illustrated in FIGURE 6 and the pump 64 performs an exhaust stroke when the armature 63 is moved from the position illustrated in FIGURE 6 into substantial alignment with the core means 67.

Therefore, it can be seen that by oscillating the housing 81 relative to the housing 80 by the electromagnetic motor 62, the fluid pump 64 is adapted to remove air or fluid from a device interconnected to the inlet means 85 thereof.

As the fluid pump 64 progressively removes the fluid from the device interconnected to the inlet 85, the pressure differential on opposite sides of the diaphragm 82 progressively increases, whereby the diaphragm 82 progressively moves inwardly from the outer periphery 83 thereof toward the inner periphery 84 thereof against a frusto-conical surface 99 of the housing 80 from the position illustrated in FIGURE 6 to the position illustrated in FIGURE 7, where substantially no flow is produced through the fluid pump 64 even though the housing 81 is oscillating relative to the housing 80.

In the normal mode of operation of the pump 64, the pump 64 will be operating under low-flow or no-flow conditions and at or near maximum vacuum.

Because of the aforementioned action of pressure differential on the diaphragm 82 of the pump 64, the armature 63 is pulled toward the pump 64, as illustrated in FIGURE 7.

Thus, the armature 63 of the pump 64 is pulled into a stronger magnetic field and the reduced air gap between the armature 64 and the core means 67 results in coil temperature rise being limited by the higher impedance caused from this mode of operation.

This is opposite to the effect produced in the device 20 as set forth in the aforementioned copending patent application where coil temperature increases as the armature is pulled out of the magnetic field at the higher vacuum.

Although the armature 63 of the device 60 of this invention is pulled into a magnetic field which increases in intensity as the pump 64 moves to a no-flow position, as illustrated in FIGURE 7, the amplitude of oscillation of the armature 63, and also the power applied to drive the pump 64, will decrease because the armature 63 and core means 67 are approaching a magnetically neutral alignment with respect to the force component driving the pump 64. Since the vacuum pump 64 operates most of the time at higher vacuums and with little flow, it is desirable that the above mode of operation prevail, to permit the coil 68 to operate with a lower temperature rise.

However, when greater fluid flow volume is required to be removed from the device interconnected to the inlet means 85 of the fluid pump 64, the reduced pressure differential across the diaphragm 82 automatically allows the diaphragm 82 to have a greater working area, because the diaphragm 82 operates farther away from the conical surface 99 of the housing 80.

While the electromagnetic device 60 can be utilized in any desired system, one such application is illustrated in FIGURES 9 and 10, wherein a vacuum program system 100 is shown and includes a card or film 101 that passes over a block or reading head 102 having a smooth reading surface 103.

The reading head 102 has one or more discharge passageways 104 with discharge ports 105 at the reading surface 103. The discharge passageways 104 are respectively connected by resilient plastic pipes 106, if desired, with one or more vacuum motors or actuators 107 which operate various levers, switches and the like of a machine, such as a washing machine or the like.

The reading head 102 also has one or more intake passageways 108 which have intake or suction ports 109 at the reading surface 103. The passageways 108 may merge into a common suction passageway or manifold 110 which is connected by a resilient plastic pipe 111, if desired, to the intake 85 of the diaphragm type fluid pump 64 and disclosed in FIGURES 6 and 7.

The card or film 101 may have a plurality of indentations or closed inverted channels 112 which bridge two or more ports, such as ports 105, 109, as illustrated in FIGURES 9 and 10. The margins of the indentations 112 form a seal with the reading surface 103 and form a flow connection between the respective vacuum actuator 107 and the source of vacuum or fluid pump 64.

The indentations 112 in each of the rows 113 and 114 are sufficiently close to maintain a substantially constant bridging action between the ports 105 and 109 and the indentations 112 pass over the ports 105 and 109. This is accomplished by making the space between the indentations 112 of the particular row 113 or 114 narrower than the diameter of the ports, if desired.

When a particular vacuum actuator 107 has been energized by being subjected to a vacuum to pull on its respective diaphragm 115, such actuator 107 may be deenergized by breaking the vacuum in its respective passageway 104 to allow its diaphragm 115 to be pulled out by combined atmospheric and spring action or the like. The vacuum may be broken by causing a hole 116 in the film 101 to pass over the respective port 105. This permits atmospheric air to enter the passageway 104 to allow the respective diaphragm 115 to move outwardly.

Ordinarily, the corresponding suction port 109, opposite the hole 116, is not uncovered, so that the film 101 prevents the breaking of vacuum in the passageway manifold 110, which is connected to the vacuum pump 64.

Because of the relatively small size of the vacuum chambers in the actuators 107 and of the respective passageways 104, only a small volume of air or fluid is introduced into the system through the hole 116. In view of this, the pump 64 ordinarily has long periods of time when it operates to maintain a vacuum without pumping any material amount of air or fluid. The ability of the diaphragm 82 of the pump 64 to reduce its effective pumping area by contact with the concave wall 99 of the housing 80 permits the pump 64 to operate with a very small power consumption.

However, when a new actuator 107 is interconnected to the pump 64 by the film 101 in the above manner, the diaphragm 82 moves away from the conical surface 99 of the housing 80 to permit a longer pump stroke to quickly reduce the volume of air in the new actuator 107, whereby the pump 64 returns to the no-flow position illustrated in FIGURE 7.

Therefore, since the pump 64, when being utilized with the system 100, is normally disposed in the no-flow position illustrated in FIGURE 7, whereby the armature 63 is pulled toward substantial alignment with the core means 67 by the diaphragm 82, the amplitude of oscillation of the armature 63 and also the power applied to drive the pump 64 will decrease, because the armature 63 and core means 67 are approaching a magnetically neutral alignment with respect to the force component driving the pump.

Further, by having the armature 63 pulled into a stronger magnetic field by the pressure differential on the diaphragm 82 when the pump 64 is disposed in a no-flow position, the reduced air gap between the armature 63 and the core means 67 results in the temperature rise of the coil 68 being limited by the higher impedance caused when in this mode of operation.

As illustrated in FIGURE 11, the electromagnetic vibrator motor 62 of the device 60 includes three terminals 117, 118 and 119, with the terminals 117 and 118 being adapted to being interconnected by suitable leads to a source of alternatnig current 120.

The terminals 117 and 119 are respectively connected to the coil 68 by leads 120 and 121, while a diode 122 is disposed between the terminals 118 and 119.

In this manner, the diode 122 provides half wave alternating current to the coil 68 to reduce the maximum losses from eddy currents and hysteresis effects to less than half of what would be experienced with fullwave electrical input.

Thus, by utilizing the diode 122, it is found that non-laminated core means can be used for the electromagnetic vibrator motor 62 of this invention without excessive temperature rise of the coil 68 and other parts of the assembly during operation thereof.

Accordingly, the frame means 61 of the device 60 can be made of a simple length of rectangular bar stock of cold rolled steel or other suitable ferromagnetic material formed into the C-shape illustrated in the drawings and having holes or other suitable provisions in the required locations necessary for mounting the pump 64 and armature 63.

Since the vibrator motor of this invention is driven by the coil 68 operated on a rectified sine half-wave power by means of the diode 122, this feature accomplishes two results.

First, the mechanical inertia of the pump 64 itself becomes less of a factor in securing good outputs and, second, the reduction of hysteresis and eddy current core losses to a maximum of less than 50% of the losses encountered with unrectified full-wave operation permits the use of a solid instead of a laminated core motor frame.

Thus, the solid core motor frame 61 reduces cost and allows a greater latitude of design which contributes to the simple, symmetrical configuration of the motor means 61.

Because the frame means 61 is relatively rigid, no clam shelling of the C-shaped frame means 61 is experienced during operation of the device 60, as is experienced in the device 20 previously described, wherein such clam shelling of the frame means 21 provides mechanical interference between the core means 26 and the armature 23.

The motor 62 of the device 60 is so designed that it may be electromagnetically driven over any range of amplitude within structural limitations, without encountering mechanical interference between the armature 63 and core means 67. By proper selection of material size for the frame means 61, the frame means 61 may be strong enough so that objectionable clam shelling of the frame means will not occur as the armature 63 is driven in an oscillatory manner by the fluctuating magnetic field.

Further, by assembling the armature 63 and leaf spring 71 to the frame means 61 so that an approximately small air gap exists when the armature 63 is at its maximum point of oscillation, the armature 63 may be driven to this amplitude without interference between it and the core means 67.

In addition, the construction of the device 60 of this invention provides a more efficient transfer of electromagnetic energy to mechanical energy from the ability to assemble the coil 68 closely adjacent the pole or core face 70 of the core means 67 so that less leakage flux occurs in the magnetic circuit.

With previous designs, such as the device 20, allowance had to be made in positioning the coil 40 relative to the pole or core faces 38 of the core means 26 so that mechanical interference did not occur between the coil 40 and the armature 23 at the widest amplitude expected of the armature 23. This resulted in a certain amount of leakage flux being unavoidable.

However, by having the armature oscillate along an axis disposed transverse to the axis of the core means as provided in the device 60, there is no possibility of the armature 63 striking the coil 68 regardless of armature amplitude.

Further, in the device 60 of this invention the magnetic neutral position of the armature 63 (armature 63 in substantial alignment with the core means 70) is more easily and definitely established than in the device 20 previously described.

This feature tends to reduce variations in output caused by variation in applied voltage (electromagnetic energy) by restricting magnetically the amplitude to which the armature can oscillate.

Therefore, the pump 64 may be positioned through its drive stem or connection 88 with respect to the armature 63 so that an over-voltage condition does not result in mechanical interference within the pump 64 and, yet, pump output at under-voltage condition remains high.

As illustrated in the drawings, the armature 63 of the device 60 of this invention utilizes a simple parallelopiped configuration and represents the simplest configuration consistent with acceptable output performance.

However, the armature 63 of this invention can be modified in view of the teachings of the device 41' of this invention previously described for improved performance.

For example, reference is made to FIGURE 12 wherein another device of this invention is generally indicated by the reference numeral 123 and is substantially identical to the device 60 previously described whereby like parts are designated by like reference numerals followed by the reference letter "a."

The only change in the device 123 over the device 60 previously described is that the armature 63a has its free surface 124 beveled at an angle of approximately 5 degrees relative to the vertical to provide improved performance.

For example, by beveling the surface 124 of the armature 63 of the device 123, a smaller operating air gap is possible than with the device 60, whereby the device 123 offers a further advantage over the device 60 in that circuit impedance is increased, which causes the coil 68a to operate with a lower rise in temperature for a particular condition of pump output.

Another device of this invention is generally indicated by the reference numeral 125 in FIGURE 14 and parts thereof similar to the device 60 previously described will be indicated by like reference numerals followed by the reference letter "b."

The armature 63b of the device 120 of this invention also has its end surface 124b beveled in substantially the same manner as the armature 63a of the device 123 for the reasons previously described.

In addition, the frame means 61b of the device 125 has the end portion 66b thereof substantially longer than the end portion 66 of the frame means 61.

Further, the end 72b of the leaf spring 71b of the device 125 is mounted to the end portion 66b of the frame means 61b a considerable distance outboard of the free end 126 thereof for a purpose now to be described.

By extending the portion 66b of the frame means 61b of the device 125 beyond the leaf spring pivot support and having the free end 126 thereof provided with a suitable radius 127, the effective length of the leaf spring 71b is shortened as the armature 63b tends to seek increased amplitude of oscillation in response to an increase in voltage applied to the coil 68b.

The shortening of the effective length of the leaf spring 71b increases the spring rate and reduces the amplitude of oscillation.

This tailoring of the output of the various pumps of this invention can also be accomplished by varying the rate of the leaf spring in the devices 60 and 123 of this invention.

In particular, reference is made to FIGURE 15 wherein a graph 128 represents the devices 60 and 123 of this invention being utilized with springs of different strength.

In general, with a weaker leaf spring of approximately 0.020 of an inch thick, the shape of the pump output curve 129 assumes a flow-limiting characteristic at small vacuum, high-flow conditions, while with a stronger leaf spring of approximately 0.025 of an inch thick, the pump output is substantially a straight line, as shown at 130.

Thus, it can be seen that the pumps of this invention can be tailored by changing the spring rate so that the dampening factor of the pump exerts more or less influence on the vibrating system.

As previously set forth, the coil 50 of the device 20 is offset relative to the centerline of the core means 26 whereby certain torsional effects are produced on the device 20 because of the unsymmetrical relationship of the electromagnetic forces produced on the armature 23, causing mechanical interference between the armature 23 and the core means 26 at certain modes of operation of the device 20.

However, from the various designs of the devices of this invention, it can be seen that the frame means, vibrator motors, armatures, and pumps thereof are all disposed on centerlines disposed in a common plane whereby the electromagnetic forces are symmetrical about the centerline of the device. For example, see FIGURE 13 as being representative of the various devices of this invention.

Therefore, it can be seen that this invention provides improved electromagnetic devices as well as improved parts thereof being particularly adaptable for driving diaphragm type fluid pumps or the like.

While the form of the invention now preferred has been disclosed as required by the statutes, other forms may be used, all coming within the scope of the claims which follow.

What is claimed is:

1. In combination, a C-shaped frame means having opposed ends directed toward each other, an electromagnetic motor carried by one end of said frame means and having an impulse frequency, said motor having core means provided with a core axis, a leaf spring having one opposed end secured to the other end of said frame means, a magnetic armature secured to the other end of said leaf spring to move along an oscillating axis transverse to said core axis, and a fluid pump carried by said frame means and operatively interconnected to said armature.

2. A combination as set forth in claim 1 wherein said fluid pump provides a suction operation when said armature is moved from its neutral position toward substantial alignment with said core means.

3. A combination as set forth in claim 1 wherein said fluid pump provides an exhaust operation when said armature is moved from its neutral position toward substantial alignment with said core means.

4. In combination, a C-shaped frame means having opposed ends directed toward each other, an electromagnetic motor carried by one end of said frame means and having an impulse frequency, said motor having core means provided with a core axis and a flat core face disposed perpendicularly to said core axis, and a magnetic armature carried by the other end of said frame means and movable along an oscillating axis transverse to said core axis, said core face looking toward said armature when said armature is in its neutral position.

5. In combination, a C-shaped frame means having opposed ends directed toward each other, an electromagnetic motor carried by one end of said frame means and having an impulse frequency, said motor having core means provided with a core axis and a core face, a magnetic armature carried by the other end of said frame means and movable along an oscillating axis transverse to said core axis, said core face looking toward said armature when said armature is in its neutral position, and a fluid pump carried by said frame means and operatively interconnected to said armature.

6. A combination as set forth in claim 5 wherein said fluid pump provides a suction operation when said armature is moved from said neutral position toward substantial alignment with said core means.

7. A combination as set forth in claim 5 wherein said fluid pump provides an exhaust operation when said armature is moved from said neutral position toward substantial alignment with said core means.

8. A combination as set forth in claim 5 wherein said armature moves toward substantial alignment with said core means as said pump operates from full flow condition toward no flow condition.

9. A combination as set forth in claim 5 wherein said armature moves away from substantial alignment with said core means as said pump operates from full flow condition toward no flow condition.

10. In combination, a C-shaped frame means having opposed ends directed toward each other, an electromagnetic motor carried by one end of said frame means and having an impulse frequency, said motor having core means provided with a core axis and a core face, said core face being perpendicular to said core axis, a leaf spring having one opposed end thereof secured to the other end of said frame means, and a magnetic armature secured to the other end of said leaf spring and movable along an oscillating axis transverse to said core axis, said leaf spring tending to hold said armature in a neutral position out of substantial alignment with said core means, said core face looking toward said armature when said armature is in its neutral position.

11. A combination as set forth in claim 10 wherein means are provided for increasing the force of said leaf spring in opposing movement of said armature toward substantial alignment with said core means as said armature moves toward substantial alignment with said core means.

12. In combination, a substantially C-shaped frame member defined by a substantially straight body portion and a pair of turned arms, an electrical coil disposed about one arm of said frame member whereby said one arm defines a core means of an electromagnetic motor, and a magnetic armature carried by the other arm of said frame member to move along an oscillating axis transverse to the axis of said one arm.

13. A combination as set forth in claim 12 wherein a fluid pump is carried by said body portion of said frame member and is operatively interconnected to said armature.

14. A combination as set forth in claim 12 wherein said one arm has an end face looking toward said armature when said armature is in a neutral position thereof.

15. A combination as set forth in claim 12 wherein a leaf spring has one opposed end thereof secured to said other arm of said frame member and the other opposed end thereof secured to said armature.

16. A combination as set forth in claim 15 wherein said one end of said leaf spring is secured to said other arm of said frame member a substantial distance from the free end of said one arm.

17. A combination as set forth in claim 12 wherein said armature has a beveled end surface.

18. A combination as set forth in claim 12 wherein said other arm of said frame member is substantially parallel to said body portion thereof.

19. A combination as set forth in claim 12 wherein said one arm of said frame member is angularly disposed relative to said body portion.

20. A combination as set forth in claim 12 wherein said other arm of said frame member is substantially perpendicular to said body portion thereof.

21. A combination as set forth in claim 12 wherein said armature is disposed between said body portion and said one arm when said armature is in its neutral position.

22. A combination as set forth in claim 12 wherein said one arm is disposed intermediate said armature and said body portion when said armature is in its neutral position.

23. In combination, a C-shaped frame means having opposed ends directed toward each other, an electromagnetic motor carried by one end of said frame means and having an impulse frequency, said motor having core means provided with a core axis and a core face, and a magnetic armature carried by the other end of said frame means and movable along an oscillating axis transverse to said core axis, said core face looking toward said armature when said armature is in its neutral position, said armature having a straight longitudinal axis, said core axis being angled relative to said axis of said armature when said armature is in its neutral position.

24. In combination, a C-shaped frame means having opposed ends directed toward each other, an electromagnetic motor carried by one end of said frame means and having an impulse frequency, said motor having core means provided with a core axis and a core face, and a magnetic armature carried by the other end of said frame means and movable along an oscillating axis transverse to said core axis, said core face looking toward said armature when said armature is in its neutral position, said armature having a straight longitudinal axis and an end surface, said end surface being beveled to reduce the average air gap as said armature is moved in substantial alignment with said core means.

References Cited by the Examiner

UNITED STATES PATENTS

| | | | |
|---|---|---|---|
| 496,648 | 5/1893 | Gregory | 310—30 |
| 1,493,259 | 5/1924 | Green | 103—53 X |
| 1,853,811 | 4/1932 | Hewitt | 103—53 |
| 2,272,855 | 2/1942 | Sullivan | 307—132 |
| 3,071,722 | 1/1963 | Roberts | 310—29 X |
| 3,127,529 | 3/1964 | Barrett | 310—21 |

ORIS L. RADER, *Primary Examiner.*

MILTON O. HIRSHFIELD, *Examiner.*